United States Patent [19]

Mueller

[11] 3,824,478

[45] July 16, 1974

[54] SHIFT REGISTER

[75] Inventor: Robert A. Mueller, Tucson, Ariz.

[73] Assignee: Electron Emission Systems, Inc., Chicago, Ill.

[22] Filed: Aug. 7, 1972

[21] Appl. No.: 278,366

[52] U.S. Cl. .................... 328/37, 313/250, 313/310, 313/338, 313/346, 315/84.5, 328/122

[51] Int. Cl. .................... G11r 19/00

[58] Field of Search .................... 328/37, 122; 315/84.5; 313/250, 338, 346, 310

[56] References Cited

UNITED STATES PATENTS

| | | | |
|---|---|---|---|
| 2,802,104 | 8/1957 | White | 250/27 |
| 2,808,203 | 10/1957 | Geyer et al. | 235/61 |
| 2,874,368 | 2/1959 | Sibley | 340/163 |
| 2,900,500 | 8/1959 | Edwards | 250/27 |
| 2,906,870 | 9/1959 | Huntley et al. | 250/27 |
| 2,912,576 | 11/1959 | Bacher | 250/27 |
| 2,922,985 | 1/1960 | Crawford | 340/173 |
| 2,988,701 | 6/1961 | Clapper | 328/37 |
| 2,991,469 | 7/1961 | McCurdy | 343/17.7 |
| 3,050,651 | 8/1962 | Beggs | 313/15 |
| 3,066,236 | 11/1962 | Sandbank | 313/250 |
| 3,308,330 | 3/1967 | Charles | 313/310 |
| 3,701,919 | 10/1972 | Geppert | 313/250 |
| 3,748,522 | 7/1973 | Geppert | 313/310 |

FOREIGN PATENTS OR APPLICATIONS

| | | | |
|---|---|---|---|
| 670,042 | 6/1950 | Great Britain | 250/27 PS |

*Primary Examiner*—Rudolph V. Rolinec
*Assistant Examiner*—Joseph E. Clawson, Jr.
*Attorney, Agent, or Firm*—Foster York

[57] ABSTRACT

Integrated circuitry configuration employing coplanar integrated circuit vacuum devices which are fabricated by photo-etching techniques in terms of lines on a flat substrate to form a shift register in which only active thermionic diodes, pentodes and capacitors are employed, and in which cross-overs of leads of the integrated circuitry are totally avoided.

21 Claims, 2 Drawing Figures

SHIFT REGISTER

BACKGROUND OF THE INVENTION

This invention relates to shift registers and, in particular, to a dynamic shift register configuration in integrated circuit form comprising thermionic elements.

In a co-pending application, Ser. No. 864,031, filed Oct. 6, 1969, in the name of Donovan V. Geppert, and assigned to the same assignee as the present application, there are disclosed integrated circuit thermionic devices of the general types presented herein. Furthermore, D. V. Geppert and Q. A. Johnson, in a co-pending application Ser. No. 278,365, disclose a dynamic shift register circuit which can be produced by integrated, solid-state vaccum techniques.

That shift register requires a number of cross-overs of clock-pulse input lines. However, cross-overs present difficult problems in thermionic integrated circuitry because the substrate on which the circuitry is printed must be heated to a temperature sufficiently high to effect emission, about 600° C., and therefore the cross-overs must operate at that temperature. Further, the integrated circuitry is laid out in thin film layers, so that considerations of the physical strength of bridging leads are important. The shift register of the present invention avoids all cross-overs, in terms of an improved circuit layout.

SUMMARY OF THE INVENTION

A shift register printed on a single substrate, and comprising two cascaded stages each consisting of thermionic diodes and pentodes and of capacitors, and an output stage, the shift register being timed by four clock pulses per bit of information, the four clock pulses arriving via four discrete lines, and the shift register requiring no cross-overs by virtue of its physical layout.

DETAILED DESCRIPTION

Figure 1:
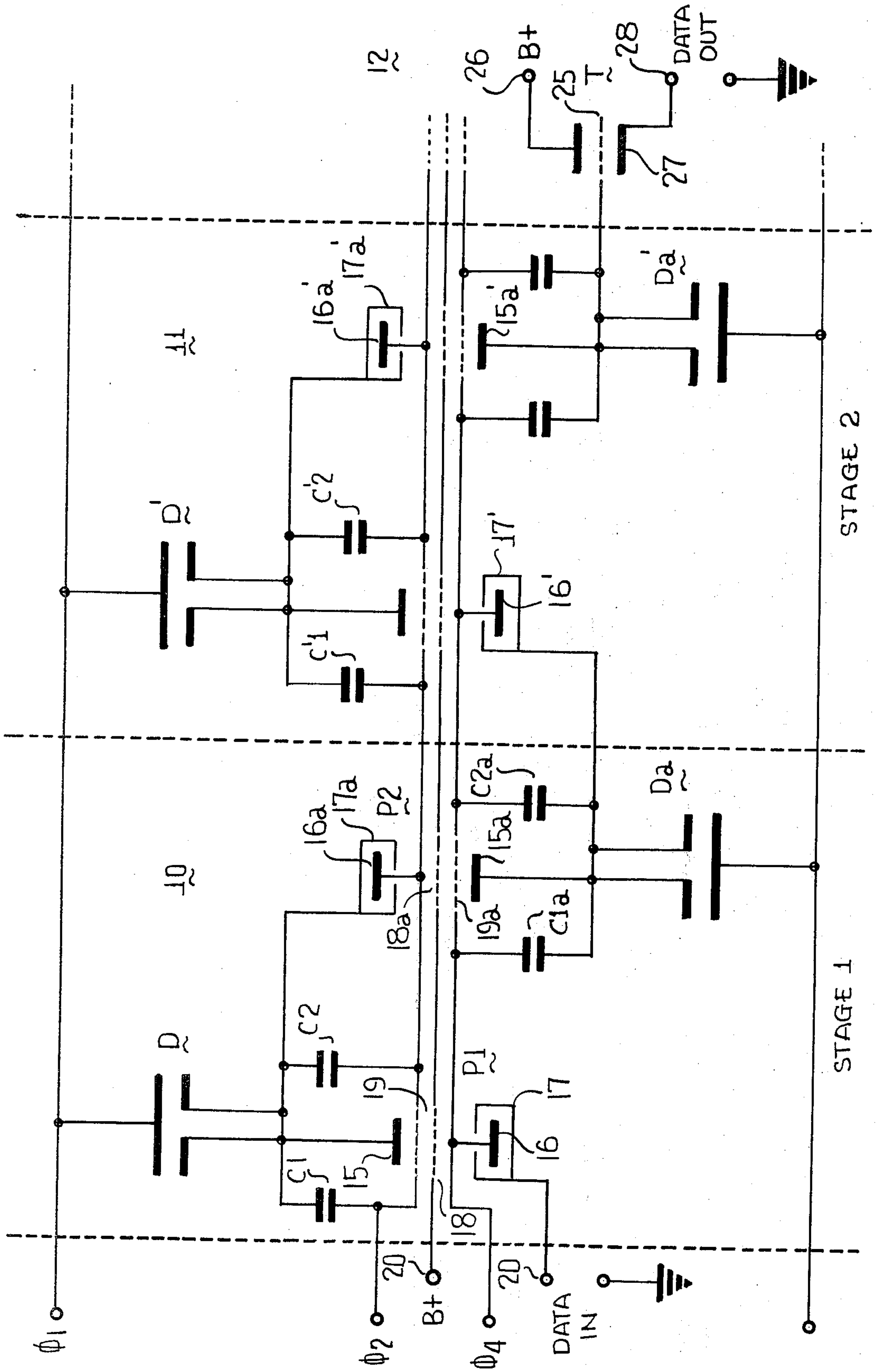
FIG. 1 is a schematized version of a physical layout of an integrated thermionic circuit, according to the invention.

FIG. 1 represents a schematized version of an integrated circuit employing thermionic devices, all included in a common envelope, on a single substrate heated to a temperature, about 600° C., adequate to effect emission from the cathodes of the system, which are coated with thermionic emission material. The system of FIG. 1 does not require any cross-overs of leads.

The system of FIG. 1 includes two stages of a shift register 10 and 11 and an output amplifier 12.

Since the stages are duplicated, any number of stages can be included in a shift register according to the system, all being connected in cascade, and only the first stage will be described in detail. The second stage, since it is illustrated, will have corresponding parts identified by the same numbers as in the first stage, but primed to distinguish.

Four clock pulse terminals are employed, the pulses being sequential in the order $\phi_1$, $\phi_2$, $\phi_3$ and $\phi_4$. Each stage requires two sets each of elements including a diode, a pentode and a capacitance, with interconnecting leads, the first set being timed by $\phi_1$ and $\phi_2$ and a second set by $\phi_3$ and $\phi_4$, and each input bit of information endures throughout $\phi_1$ to $\phi_4$, and is represented by a positive signal representing a "1" and a zero or negative signal representing a "0."

The pulse $\phi_1$ goes from about −15.V to +20.V and then back to −15.V. It is applied by diode $D_1$ to charge capacitors $C_1$ and $C_2$, in parallel, line $\phi_2$ then being at ground potential. The anode 15 of pentode $P_1$ is connected directly to the cathode 16 of $D_1$, so that in response to $\phi_1$ the anode 15 goes positive by a few volts. Prior to $\phi_1$ there might have been a negative or a positive potential on $C_1$, $C_2$. Any negative charge is removed by $\phi_1$ and any positive charge reinforced. The cathode 16 of $P_1$ is grounded by line $\phi_4$ during $\phi_1$ and $\phi_2$, and $P_1$ includes a control electrode 17, which largely surrounds cathode 16, except for an aperture in 17 through which a lead from cathode 16 extends to lead $\phi_4$. Two additional electrodes are provided between control electrode 17 and anode 15, identified respectively as 18 and 19. Electrode 18 is maintained at constant B+ voltage from terminal 20, and 19 is connected directly to $\phi_2$. When $\phi_2$ occurs $C_1$ and $C_2$ are charged through pentode $P_1$, if the latter is conductive, acquiring a negative charge at anode 15 with respect to the clock pulse. When the clock pulse terminates, the anode 15 therefore goes negative by the value of voltage on capacitors $C_1$ and $C_2$. If the pentode $P_1$ is non-conductive, capacitors $C_1$ and $C_2$ receive no new charge, and the positive charge previously inserted remains. Control electrode 19 is at constant clock voltage equal to the amplitude of $\phi_2$, if $P_1$ is conductive, but anode 15 decreases in voltage as $C_1$, $C_2$ charge so that control electrode 19 serves as an accelerating electrode, enhancing anode current. Electrode 18 performs a similar function, and the control of conductivity of $P_1$ devolves on control electrode 17. If the latter is positive, in response to a "1" input, the pentode $P_1$ can conduct, but if the latter is at zero or negative voltage, the pentode $P_1$ cannot conduct.

Accordingly, anode 15 acquires either a positive or a negative voltage, in response to $\phi_1$ and $\phi_2$, depending on whether an input data bit applied at terminal 20, and thence to control electrode 17, is a "0" or a "1," respectively.

The control electrode 17*a* of pentode $P_2$ is directly connected to the anode of $P_1$, and it utilizes the voltage of anode 15 as its input information bit, reversing the sign of the latter bit at its anode 15*a*, which is in turn connected directly to control electrode 17' of stage II, acting as an input signal for that stage.

After all stages of an information bit applied to terminal 20 have attained the anode of the last register stage, in this case 11, the signal on the anode 15*a* is applied to the control electrode 25 of a triode T, having its anode directly connected to a B+ terminal 26 and its cathode 27 available for a cathode load via terminal 28.

The physical alignment of control electrodes, and the path for charging $C_1$, $C_2$, which utilizes an electrode 19 as part of its path, and the passage of lead $\phi_4$ through the pentodes, acting to control electron flow in the case of $P_2$ but not of $P_1$, the utilization of the $\phi_2$ and $\phi_4$ line, extending through the pentodes, to provide ground for the cathodes, has enabled the layout of the present invention to dispense totally with crossovers, while operating precisely as does the shift register of Geppert et al, supra, except for the inclusion of an intermediate grid 18, 18*a*. The latter can be dispensed with in a device having adequately high transconductance. The vital consideration is that in distinction to the situation in Geppert et al, supra, the $\phi_2$ and $\phi_4$ lines extend through the pentodes and operate as control electrodes.

The signals on $\phi_1$ and $\phi_3$ proceed from a normal high negative value (−15.V.) to a high pulse peak (+20.V.) at the clock pulse and then back, in order that there be normally available at the anode of D a negative voltage sufficiently high to clamp any negative voltage on $C_1$, $C_2$. $\phi_2$, $\phi_4$ do not have any clamping function and therefore can have a normal value of zero voltage, until a clock pulse occurs and the latter goes positive about 20.V.

Figure 2:
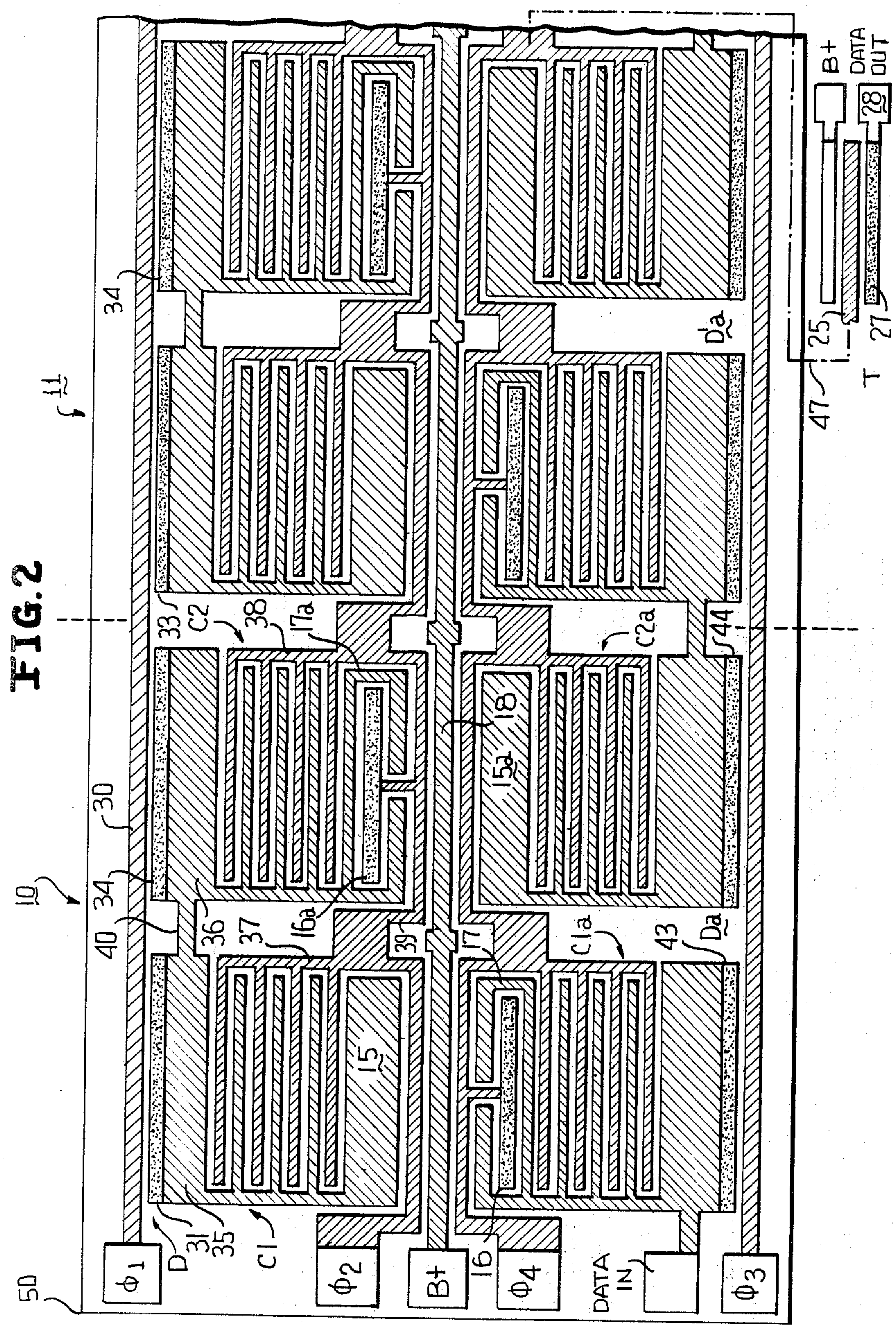
FIG. 2 is a plan view of an actual physical layout of an integrated thermionic circuit, according to FIG. 1.

Turning now to FIG. 2, there is illustrated a physical layout of the system of FIG. 1, as actually laid out on a heated substrate. The layer 30 constitutes the $\phi_1$ lead of FIG. 1 and itself constitutes the anodes of diodes D, D', etc. for an entire shift register, these having individual cathodes 31, 32, 33, 34. The cathodes 31 – 34, inclusive, are juxtaposed throughout to capacitor plates 35, 36 (taking the first stage of the register only), these corresponding with the upper plates of $C_1$ and $C_2$ in FIG. 1. The lower plates of $C_1$ and $C_2$ are identified as 37, 38, respectively. Plates 37 and 38 are directly interconnected by lead 39, plates 35, 36 by lead 40.

Integral with plate 37 is anode 15 and integral with capacitor plate 38 is control grid 17*a*, which controls electron flow from cathode 16*a*.

The $\phi_2$ lead proceeds immediately below anode 15 and is directly connected with cathode 16*a* through an opening 40 in control electrode 17*a*.

B+ lead 18 extends through all the amplifier sections of the register, parallel to the $\phi_2$ lead spatially, and serving only to enhance electron flow. The $\phi_4$ lead proceeds spatially parallel to the B+ lead 18 and is connected directly to cathode 16, through an opening in control grid 17.

The $\phi_3$ lead is a single strip of deposited metal, as id $\phi_1$ lead 30 and lies adjacent to but separated from cathodes 43, 44 of diode D*a*, which in turn are directly in contact with the lower plates of capacitors $C_{1a}$ and $C_{2a}$, the lower plates being integral with anode 15*a*.

The two sections comprising the shift register stage 10 are duplicates, but spatially inverted with respect to each other, and each section serves to provide capacitance for the other, i.e., $C_1$ and $C_2$ are one in the first section and the other in the second section of stage 10, as are $C_{1a}$ and $C_{2a}$. The capacitors are all interdigital so that maximum capacitance is achieved along minimum length of the shift register.

The output triode stage T has its control electrode 25 directly connected to the cathodes of D'*a* via lead schematically illustrated as 47.

There exists, therefore, a complete parallelism between the circuitry of FIGS. 1 and 2, FIG. 1 indicating all major features of circuit layout and FIG. 2 indicating actual physical layout.

Normally the wafer on which the metallic deposits of FIG. 2 are laid is a sapphire wafer perhaps 3/4 inch in diameter, and electrically headed on its under surface, so that the entire wafer is at about 600° C. The wafer is not illustrated, in FIG. 2, other than by the outline 50, the thin film circuitry being located on the top surface of the wafer. FIG. 2 is then a plan view of thin film circuitry on a wafer.

Returning now to FIG. 1, the positive charge accumulated on $C_1$, $C_2$ does not leak off, even if the input signal is a 1, because amplifier devices of the co-planar type, i.e., which have all elements in a common plane, require a minimum anode voltage to enforce any anode current at all. This minimum is not exceeded across $C_1$, $C_2$. The $\phi_1$ pulse may therefore in a broad sense be considered to have the net effect of erasing any negative potential previously acquired by $C_1$, $C_2$. On the other hand, when $C_1$, $C_2$ acquires a negative voltage at anode 15, charge cannot leak off via D because $\phi_1$ maintains a normally high negative potential.

What I claim is:

1. A shift register stage including first and second amplifying devices, each of said devices including an anode, a cathode and a control electrode, first and second capacitors each connected in series with one of said anodes, diodes for discharging negative charge on said capacitors and for charging said capacitors slightly positive, said diodes including anodes and also including cathodes respectively directly connected to said anodes of said respective devices, means for connecting tha anode of a first of said devices directly to said control electrode of the second of said devices, a source of first, second, third and fourth timewise sequential pulses having separate, respectively, first, second, third and fourth leads for separately conveying said clock pulses, means connecting said first lead to the anode of said first diode, means connecting the second of said leads to said first anode via said first capacitor, means connecting the third of said leads to the anode of said second diode, means connecting the fourth of said leads via said second capacitor to the anode of said second amplifying device, and means for applying a succession of 1 and 0 pulses, each enduring for four of said clock pulses, to the grid of said first device, wherein said second and fourth of said leads extend between said anodes and cathodes of said first and second devices and constitute said control electrodes for said devices, and wherein said first and third of said leads constitute said anodes of said diodes, respectively.

2. The combination according to claim 1, wherein is further provided a further lead extending through said devices between anode and control electrode, parallel means for applying a steady positive potential to said further lead, whereby said further lead constitutes an accelerator electrode.

3. The combination according to claim 1, wherein said second and fourth leads extend through said devices between the anodes and cathodes of said devices.

4. The combination according to claim 1, wherein said first and third of said leads constitute said anodes of said diodes.

5. The combination according to claim 1, wherein said second and fourth leads extend through said devices between anodes and cathodes of said devices, and wherein said first and third of said leads constitute said anodes of said diodes and lie externally of said devices.

6. The combination according to claim 1, wherein said anodes and control electrodes and capacitors are thin film elements deposited on an insulating substrate.

7. A shift register stage having first and second amplifiers, each of said amplifiers including an anode, a cathode and a control electrode, each of said amplifiers having the property that in the presence of substantially cathode potential on its control electrode said each of said amplifiers is non-conductive despite application of positive voltage to its anode, means directly connecting the anode of said first amplifier to the control electrode of said second amplifier, a first capacitor connected in series with said anode of said first amplifier, a second capacitor connected in series with said anode of said second amplifier, a source of repeated cycles of first, second, third and fourth clock pulses occurring in the order recited, a source of signal pulses selectively of one and zero value each of which endures through each of said cycles of clock pulses connected to said control electrode of said first amplifier, means responsive to a first of said clock pulses for applying a first positive voltage on said first capacitor at its electrode connected directly to the anode of said first of said amplifiers, means responsive to the second of said clock pulses for reducing said first voltage to a negative value only if said signal pulses is a one and not a zero, means responsive to a third of said clock pulses for applying a first positive voltage on said second capacitor at its electrode connected directly to the anode of said second amplifier, means responsive to a fourth of said clock pulses for reducing said second charge to a negative value only if the potential of said anode of said first amplifier is positive in potential, wherein is provided two continuous leads respectively carrying said second and fourth of said clock pulses, said leads extending directly through said amplifiers of said shift register stage between said anodes and cathodes.

8. A shift register stage including two electronic amplifying devices, each of said devices having an anode, a cathode, a control electrode and an accelerating electrode, a source of selectively 1 and 0 information bearing pulses of repectively positive and one of zero and negative polarity, said devices being solely capacitive anode loads, said loads being the sole passive elements of said stage, means responsive to application of one of said pulses to said control electrode of said first device for transferring a positive pulse to the anode of the other of said devices and to application of one of said pulses to said control electrode of said first device for transferring a negative pulse to the anode of the other of said devices, wherein said devices are photo-etched thin film devices each duplicating the other but oppositely spatially oriented.

9. A shift register stage consisting of a first thermionic device having an anode, a cathode and a control electrode, a first capacitor connected in series with said anode and having an electrode directly connected to said anode, a second thermionic device having an anode, a cathode and a control electrode, a second capacitor connected in series with and having an electrode directly connected to the anode of said second device, a first diode having an anode and a cathode and having its cathode directly connected to said anode of said first device, a second diode having an anode and a cathode and having its cathode directly connected to said anode of said second device, each of said devices being conductive only in response to positive voltage applied concurrently to their anodes and control electrodes, and means for applying first and third positively going clock pulses extending from a negative voltage base in succession to the anode of said first diode and to the anode of the second diode, means for applying second and fourth positively going clock pulses in succession to said anodes via said capacitors of said devices, and means for applying 1 and 0 information bearing signals selectively to the control electrode of said first thermionic device said 1 signal one of being a positive voltage and said 0 signal a zero or negative voltage, wherein said devices and said diode anodes and said capacitors are photo-etched thin films on a common substrate.

10. A shift register stage consisting of a first thermionic device having an anode, a cathode and a control electrode, a first capacitor connected in series with said anode and having an electrode directly connected to said anode, a second thermionic device having an anode, a cathode and a control electrode, a second capacitor connected in series with and having an electrode directly connected to the anode of said second device, a first diode having an anode and a cathode and having its cathode directly connected to said anode of said first device, a second diode having an anode and a cathode and having its cathode directly connected to said anode of said second device, each of said devices being conductive only in response to positive voltage applied concurrently to their anodes and control electrodes, and means for applying first and third positively going clock pulses extending from a negative voltage base in succession to the anode of said first diode and to the anode of the second diode, means for applying second and fourth positively going clodk pulses in succession to said anodes via said capacitors of said devices, and means for applying 1 and 0 information bearing signals selectively to the control electrode of said first tube, said 1 signal being a positive voltage and said 0 signal a zero or negative voltage, wherein said capacitors each has an electrode integral with one of said anodes.

11. The combination according to claim 10, wherein said diodes each has a cathode integral with the electrode of one of said capacitors.

12. The combination according to claim 10, wherein said capacitors each has one electrode integral with one of said anodes and wherein said diodes each has a cathode integral with said one of said anodes of said devices.

13. The combination according to claim 12, wherein each of said devices includes an accelerating electrode integral with another electrode of one of said capacitors.

14. The combination according to claim 12, wherein said means for conveying said first and third of said clock pulses constitute anodes for said diodes, respectively.

15. The combination according to claim 14, wherein said means for applying said second and fourth positively going clock pulses constitute leads extending commonly through said devices.

16. The combination according to claim 15, wherein said control electrodes are integral with electrodes of said capacitors, respectively.

17. A thermionic device, including an anode, a thermionic cathode, a control electrode substantially encompassing said cathode and having an aperture, sources of first and second, third and fourth clock pulses, a source of a bit of information having selectively a 1 and a 0 value, means for connecting said first source to said control electrode, a lead extending through said device and connected to said cathode via said aperture, an accelerating electrode located between said anode and said control electrode and connected to said source of second clock pulses, a diode having an anode and a cathode, said source of said first clock pulses constituting said anode of said diode, a capacitor having one electrode directly connected to said anode of said device and having another electrode directly connected to said source of a second clock pulse.

18. The combination according to claim 17, wherein is provided a further accelerating electrode located between said first mentioned accelerating electrode and said control electrode.

19. A thin film system, including an amplifying device having an anode, a cathode and a control electrode, a first interdigitated capacitor, said anode comprised in an electrode of said capacitor, a diode having an anode and a cathode, said cathode of said diode being integral with said electrode, a second interdigitated capacitor, said cathode of said device being connected to one electrode of said second capacitor, said control electrode substantially surrounding said cathode of said device and being integral with another electrode of said second capacitor.

20. A multi-stage thin film shift register, each of said stages including two cascaded amplifier devices, each having an anode, a cathode, a control elelctrode and an accelerating electrode, and said stages being connected in cascade and located in a line, said devices of each stage being oriented in opposite orientations and all said devices extending at right angles to said line, four leads each carrying a differently timed clock pulse for controlling said shift register, two of said four leads extending parallel to said line externally of all said devices, said devices extending between said two of said four leads, a further two of said four leads extending through all said devices between their anodes and cathodes and parallel to said line.

21. The combination according to claim 20, wherein each of said two further leads constitute an accelerating electrode of one device of each of said stages and a connection to a control electrode of the other device of each of said stages.

* * * * *